United States Patent [19]

Gergen

[11] Patent Number: 5,084,515

[45] Date of Patent: Jan. 28, 1992

[54] POLYMER BLEND

[75] Inventor: William P. Gergen, Houston, Tex.

[73] Assignee: Shell Oil Company, Houston, Tex.

[21] Appl. No.: 332,674

[22] Filed: Mar. 31, 1989

[51] Int. Cl.$^5$ .................. C08L 71/12; C08F 283/08
[52] U.S. Cl. .................. 525/132; 525/133; 525/185; 525/391; 525/392; 525/539; 525/905
[58] Field of Search ............. 525/132, 133, 391, 392, 525/185, 539, 905

[56] References Cited

U.S. PATENT DOCUMENTS

| | | | |
|---|---|---|---|
| 2,495,286 | 1/1950 | Brubaker | 260/63 |
| 3,257,357 | 6/1966 | Stamatoff | 260/47 |
| 3,257,358 | 6/1966 | Stamatoff | 260/47 |
| 3,264,272 | 8/1966 | Rees | 260/78.5 |
| 3,306,874 | 2/1967 | Hay | 260/47 |
| 3,306,875 | 2/1967 | Hay | 260/47 |
| 3,356,761 | 12/1967 | Fox | 260/874 |
| 3,383,435 | 5/1968 | Cizek | 260/874 |
| 3,404,134 | 10/1968 | Rees | 260/78.5 |
| 3,665,058 | 5/1972 | Snodgrass et al. | 260/889 |
| 3,781,382 | 12/1973 | Izawa et al. | 260/874 |
| 4,526,927 | 7/1985 | Hambrecht et al. | 525/68 |
| 4,584,332 | 4/1986 | Talley et al. | 524/122 |
| 4,598,100 | 7/1986 | Krutchen et al. | 521/81 |
| 4,598,104 | 7/1986 | Krutchen et al. | 521/139 |
| 4,871,810 | 10/1989 | Saltman | 525/133 |
| 4,874,819 | 10/1989 | George et al. | 525/185 |

FOREIGN PATENT DOCUMENTS

| | | |
|---|---|---|
| 121965 | 10/1984 | European Pat. Off. . |
| 181014 | 5/1986 | European Pat. Off. . |
| 1081304 | 8/1967 | United Kingdom . |

Primary Examiner—John C. Bleutge
Assistant Examiner—Thomas Hamilton, III
Attorney, Agent, or Firm—James O. Okorafor

[57] ABSTRACT

Blends of a linear alternating polymer of carbon monoxide and at least one ethylenically unsaturated hydrocarbon with a lesser amount of a poly(vinylaromatic)-modified polyphenylene oxide polymer exhibit improved modulus in comparison to the linear alternating polymer.

11 Claims, No Drawings

POLYMER BLEND

FIELD OF THE INVENTION

This invention relates to polymer blends of predominantly a linear alternating polymer of carbon monoxide and at least one ethylenically unsaturated hydrocarbon. More particularly, the invention relates to blends of the linear alternating polymer with a poly(vinylaromatic)-modified polyphenylene oxide polymer.

BACKGROUND OF THE INVENTION

The class of polymers of carbon monoxide and olefins has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended this process to produce linear alternating polymers by the use of arylphosphine complexes of palladium moieties and certain inert solvents. See, for example, U.S. 3,694,412.

More recently, the class of linear alternating polymers of carbon monoxide and at least one ethylenically unsaturated hydrocarbon, e.g., carbon monoxide and ethylene or carbon monoxide and ethylene and propylene, has become of greater interest in part because of the greater availability of the polymers in quantity. These polymers, often referred to as polyketones or polyketone polymers, have been shown to be of the repeating formula $-CO-(A)-$ where A is the moiety of unsaturated hydrocarbon polymerized through the ethylenic unsaturation. For example, when the ethylenically unsaturated hydrocarbon is ethylene the polymer is represented by the repeating formula $-CO-(CH_2-CH_2)-$. The general process for the more recent production of such polymers is illustrated by a number of published European Patent Applications including 121,965 and 181,014. The process typically involves a catalyst composition formed from compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for food and drink and internal as well as external parts for automotive application. The polymers are processed by known methods such as injection molding, extrusion and thermoforming. For some particular applications it has been found to be desirable to have polymer properties which are somewhat different from those of the polyketone polymers. It would be of advantage to retain the more desirable properties of the polyketone polymers and yet improve other properties. These advantages are often obtained through the provision of a polymer blend.

SUMMARY OF THE INVENTION

The present invention contemplates the provision of blends of, as a major component, a linear alternating polymer of carbon monoxide and at least one ethylenically unsaturated hydrocarbon and, as a minor component, a poly(vinylaromatic)-modified polyphenylene oxide polymer. A small amount of an acid polymer or a fatty acid stearate is added as a processing aid. Such blends exhibit increased modulus in comparison with the polyketone polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, 1-butene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide or terpolymers of carbon monoxide, ethylene and a second hydrocarbon of at least three carbon atoms, particularly an alpha-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blend of the invention there will be within the terpolymer at least two units incorporating a moiety of ethylene for each unit incorporating a moiety of the second hydrocarbon. Preferably there will be within the terpolymer from about 10 units to about 100 units incorporating a moiety of ethylene for each moiety incorporating a moiety of the second hydrocarbon. The polymer chain is therefore represented by the repeating formula

where D is the moiety obtained by polymerization of the second hydrocarbon through the ethylenic unsaturation. The $-CO-(CH_2-CH_2)-$ units and the $-CO-(D)-$ units are found randomly throughout the polymer chain and the ratio of y:x is no more than about 0.5:1. In the modification of the invention where copolymer of carbon monoxide and ethylene is employed as the blend component, there will be no second hydrocarbon present and the polyketone polymer is represented by the above formula wherein y=0. When y is other than 0, i.e., terpolymers are employed, ratios of y:x from about 0.01:1 to about 0.1:1 are preferred. The end groups or "caps" will depend what materials are present during the production of the polyketone polymer and how and whether the polyketone is purified. The precise physical properties of the polymer will not depend to any considerable extent on the end groups so that the polymer is fairly represented by the above formula for the polymer chain. Of particular interest are the polyketones of number average molecular weight from about 1,000 to about 200,000, particularly those polyketones of number average molecular weight of from about 10,000 to about 90,000, as determined by gel permeation chromotography. The physical properties of the polyketones will depend in part on the molecular weight of the polymer, whether the polymer is a copolymer or a terpolymer and, in the case of terpolymers, the proportion of the second hydrocarbon present. Typical melting points of such polymers are from about 175° C. to about 300° C., but more often from about 210° C. to about 270° C. The polymers will have a limiting viscosity number (LVN) when measured in a standard capillary viscosity measuring device in m-cresol at 60° C. of from about 0.5 to about 10, preferably from about 1.1 to about 2.5.

A method of producing the polyketone polymers which is now becoming conventional is to contact the carbon monoxide and unsaturated hydrocarbon(s) in the presence of a catalyst composition formed from a palladium compound, the anion of a non-hydrohalogenic acid having a pKa below about 6 and a bidentate phosphorus ligand. The scope of the process for polyketone polymer production is extensive but, without wishing to be limited, the preferred palladium compound is a palladium carboxylate, preferably palladium acetate, the preferred anion is the anion of trifluoroacetic acid or p-toluenesulfonic acid and the preferred bidentate ligand is 1,3-bis(diphenylphosphino)propane or 1,3-bis[-di(2-methoxyphenyl)-phosphino]propane. Such a process for polyketone production is further illustrated by copending U.S. patent application Ser. No. 930,468, filed Nov. 14, 1986 now abandoned.

Polymerization is conducted in a gas phase or in a liquid phase in the presence of an inert liquid diluent such as an alkanol, e.g., methanol or ethanol. The reactants are contacted under polymerization conditions in the presence of the catalyst composition by conventional methods such as shaking or stirring in a reaction vessel. Suitable reaction temperatures are from about 20° C. to about 150° C. with preferred reaction temperatures being from about 50° C. to about 135° C. Typical reaction pressures are from about 1 bar to about 200 bar, more typically from about 10 bar to about 100 bar. Subsequent to reaction, the polymer product is recovered by conventional methods such as filtration or decantation. The polymer product may contain residues of the catalyst which are removed, if desired, by contact with a solvent or extraction agent which is selective for the residues.

The minor component of the blends of the invention is a poly(vinylaromatic)-modified polyphenylene oxide polymer, that is, a polyphenylene oxide polymer which has been modified by the inclusion therewith of a polymerized vinylaromatic compound.

The polyphenylene oxide polymer is a polymer wherein a plurality of phenylene rings, optionally substituted with up to 4 substituents besides hydrogen, are interconnected by oxygen linkages. In the broader aspects of the invention, the polyphenylene oxide is represented by the repeating formula

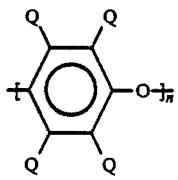

wherein n is an integer of at least 100, and Q independently is hydrogen, halogen, hydrocarbon free from tertiary alpha-carbon atoms, halohydrocarbon radicals having at least two carbon atoms in between the halogen and the benzene ring and being free from tertiary alpha-carbon atoms, hydrocarbonoxy free from tertiary alpha-carbon atoms and halohydrocarbonyloxy having at least two carbon atoms between the halogen and the benzene ring and being free from tertiary alpha-carbon atoms. Such polyphenylene oxide polymers are well known in the art as are the methods for their production. Typical examples of polymers and synthesis procedures are found in Hay, U.S. Pat. Nos. 3,306,874 and 3,306,875 and Stamatoff, U.S. Pat. Nos. 3,257,357 and U.S. 3,257,358, incorporated herein by reference. The preferred polyphenylene oxide polymers are those having alkyl substitution in at least one and preferably both positions ortho to an oxygen linking moiety, i.e., a poly(2,6-dialkylphenylene oxide). Most preferred is poly(2,6-dimethylphenylene)oxide which is commercially available.

The poly(vinylaromatic) polymer with which the polyphenylene oxide polymer is modified is a polymer having as a major component a polymerized vinylbenzene compound comprising a benzene ring with a vinyl substituent optionally substituted in the alpha position and up to 5 additional substituents. Preferred poly(vinylaromatic) polymers are those wherein the vinylbenzene unit is represented by the formula

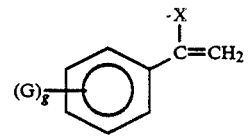

wherein X is hydrogen or lower alkyl, i.e., an alkyl of up to 4 carbon atoms inclusive, G is middle halogen, i.e., chlorine or bromine, or lower alkyl and g is an integer from 0 to 5 inclusive. Such units are styrene or derivatives of styrene such as alpha-methylstyrene, p-methylstyrene, p-ethylstyrene or m-methylstyrene, of which styrene is the preferred vinylbenzene unit on which the poly(vinylaromatic) polymer is based. The poly(vinylaromatic) polymer is suitably provided as a homopolymer, or as a polymer having two or more different types of vinylbenzene units, or as a polymer with other polymerizable monomers such as styrene-acrylonitrile polymer (SAN), styrene-butadiene or a styrene acrylonitrile-butadiene polymer wherein the vinylbenzene unit is at least 25% by weight of the polymer and preferably at least 50% of the total polymer. Preferred poly(vinylaromatic) polymers for use as the polyphenylene oxide modifier are homopolymers of the vinylbenzene unit and most preferred is polystyrene.

The polyphenylene oxide polymer is modified by inclusion of the poly(vinylaromatic) polymer therewith. In one embodiment, modification of the polyphenylene oxide polymer is effected by blending the poly(vinylaromatic) polymer and the polyphenylene oxide polymer into a substantially uniform mixture. Such blending comprises a physical admixture of the polymers and is conducted by conventional techniques employing mechanical mixing devices commonly used for blending of plastic or elastomeric materials, such as an extruder or Banbury mixer. The blending or mixing is conducted at sufficiently elevated temperatures to soften the components so that they are thoroughly dispersed and mixed with each other. Such a process is also known in the art, having been disclosed by Cizek, U.S. Pat. No. 3,383,435, for example. Blends are also prepared by dissolving the polyphenylene oxide polymer and the poly(vinylaromatic) polymer in a suitable solvent such as toluene or xylene and subsequently precipitating the polymer blend by the addition of a non-solvent such as isopropanol. In a second embodiment wherein the polyphenylene oxide polymer is modified with the poly(vinylaromatic) polymer, the desired polyphenylene oxide and vinylbenzene compound are dissolved in a mutual solvent. One component, typically the polyphenylene oxide, is polymerized with a catalyst useful for that purpose. The resulting polyphenylene oxide particles, swollen with the vinylbenzene compound, are then treated with a catalyst which is useful in the polymerization of the vinylbenzene compound. The resulting modified product is then recovered as by filtration. This process is further described by Izawa et al, U.S. Pat. No. 3,781,382, incorporated herein by reference. By whatever method the polyphenylene oxide polymer is modified, the relative proportions of the polyphenylene oxide polymer and the poly(vinylaromatic) polymer may suitably vary from a weight ratio of about 9:1 to a weight ratio of about 1:9. However, the preferred poly(vinylaroamtic)-modified polyphenylene oxides are those wherein the polyphenylene oxide polymer is at least 50% by weight of the total poly(vinylaromatic)-modified polyphenylene oxide polymer and preferably at least 66% by weight on the same basis.

The blends of the invention comprise a major proportion of the polyketone polymer and a minor proportion of the poly(vinylaromatic)-modified polyphenylene oxide polymer. The precise percentage of the components of the blend to be employed is not critical, although amounts of poly(vinylaromatic)-modified polyphenylene oxide from about 0.5% by weight to about 45% by weight, based on total blend are satisfactory. Amounts of poly(vinylaromatic)-modified polyphenylene oxide polymer from about 1% by weight to about 25% by weight on the same basis are preferred.

Processing of the blend is facilitated by addition of less than 5%, preferably less than about 1%, by weight of an acid polymer or a fatty acid stearate such as glycerol monostearate. The acid polymer is preferably an carboxylic acid polymer. The acid polymer may be a partial non-alkali metal salt of an α-olefin/unsaturated carboxylic acid polymer. By the term partial non-alkali metal salt is meant that some but not all of the carboxylic acid moieties have been neutralized with zinc, aluminum, or magnesium as further discussed below. Because the partially neutralized material retains ionic character while being polymeric in form, the material is often referred to as a metal ionomer.

The α-olefin component of the acid polymer is preferably an α-olefin of up to 10 carbon atoms inclusive such as ethylene, propylene, 1-butene, 1-octene and 1-decene. Preferred α-olefins are straight chain α-olefins of up to 4 carbon atoms inclusive and particularly preferred is ethylene. The α-olefin component of the partially neutralized polymer is present in at least 80% by mol, based on the total base polymer, i.e., the non-neutralized polymer, and preferably present in at least 90% by mol on the same basis.

The unsaturated carboxylic acid component of the acid polymer is preferably an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which, methacrylic acid is preferred. The unsaturated carboxylic acid monomer content of the acid polymers is from about 1% by mol to about 20% by mol based on the base or non-neutralized polymer. Amounts of carboxylic acid from about 9% by mol to about 15% by mol on the same basis are preferred. Certain of these acid polymers are commercially available and are marketed under the trademarks PRIMACOR acid polymers and NUCREL acid polymers.

The metal ionomer is produced by reacting the α-olefin/unsaturated carboxylic acid polymer with a source of the ionizable metal compound sufficient to neutralize from about 10% to about 90% of the carboxylic acid groups present in the polymer. Such neutralization with ionizable zinc, which is the preferred metal, results in a uniform distribution of zinc throughout the polymer. Neutralization of from about 20% to about 80% of the carboxylic acid groups is preferred and neutralization of from about 35% to about 75% of the carboxylic acid groups is particularly preferred. The metal ions suitably employed in the partial neutralization are uncomplexed non-alkali metal ions including zinc ions, aluminum ions, and magnesium ions which are provided in compounds of the type often referred to as metal salts, e.g., zinc chloride, zinc acetate and zinc formate, or are complexed metal ions wherein the metal is bonded to two types of groups, at least one of which is readily ionized from the metal and the other is not. Illustrative of such complexed metal ions are mixed zinc salts with one weak acid such as oleic acid or stearic acid and one more ionizable acid such as acetic acid or formic acid. In general, neutralization with a complexed zinc ion is most preferred. Methods of producing the metal ionomers are known in the art and are disclosed in U.S. Pat. No. 3,264,272 and U.S. Pat. No. 3,404,134 which are incorporated herein by reference. Certain of these partially neutralized polymers, i.e., the metal ionomers, are commercially available and are marketed under the trademark SURLYN ® by DuPont.

The method of producing the blend is not material so long as a substantially uniform mixture of the polyketone polymer and the poly(vinylaromatic)-modified polyphenylene oxide polymer is obtained. The polyketone-modified polyphenylene oxide blend is a non-miscible blend with the modified polyphenylene oxide polymer existing as a discrete phase in the polyketone matrix having a phase size from about 1 micron to about 8 microns. The blend will not, therefore, be homogeneous but good results are obtained when the distribution of the modified polyphenylene oxide polymer throughout the polyketone polymer matrix is substantially uniform. The method of blending is that which is conventional for the blending of non-miscible polymers. In one modification the materials in a finely divided form are passed through an extruder to produce the blend as an extrudate. In an alternate modification, the components are blended in a mechanical mixing device which exhibits high shear.

The blends of the invention may also contain conventional additives such as antioxidants, stabilizers, fillers, fire resistant chemicals, mold release agents and other materials which increase the processability of the polymers or modify the properties of the blend. Such additives are added by conventional methods prior to, together with or subsequent to the blending of the polyketone polymer and the poly(vinylaromatic)-modified polyphenylene oxide polymer.

The blends of the invention are characterized by improved modulus when compared with the polyketone polymers. The blends are of particular utility where production of articles involving molten polymer are employed. The blends are processed by the customary techniques such as extrusion and injection molding into sheets, films, fibers and shaped articles useful in packaging applications and in containers for liquid products.

The invention is further illustrated by the following Illustrative Embodiments which should not be construed as limiting.

COMPARATIVE EXAMPLE I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 1.29 when measured in m-cresol at 60° C. Small amounts of IRGANOX 1076 and IONOL, which are conventional hindered phenolic antioxidants, were added as stabilizers.

The terpolymer was extruded in a twin screw Baker Perkins extruder at 275° C. and 300 rpm then injection molded at 275° C. and 500 psi for measurement of impact strength, tangent modulus, and other properties. The molded sample had a notched Izod impact strength of 2.7 ft. lbs/in, a tangent modulus of 202,000, and other properties as shown in Table I.

COMPARATIVE EXAMPLE II

A molded sample of the polyketone polymer of Comparative Example I was produced with the same procedure as described in Comparative Example I except that 1% by weight of SURLYN 9520 was added as a processing aid and 0.5% by weight of ETHANOX 330 was added as an antioxidant. The molded sample had a notched Izod impact strength of 3.3 ft. lbs/in. a tangent moduls of 197,000 and other properties as shown in Table I.

ILLUSTRATIVE EMBODIMENT I

A molded sample of a blend of the polyketone polymer of Comparative Example I and 20% by weight (based on the binary blend) of GE Plastics' NORYL 731, an amorphous poly(vinylaromatic)-modified polyphenylene oxide polymer having a glass transition temperature of 137° C., was produced with the same procedure as described in Comparative Example II except that the injection pressure was 600 psi. The molded sample had a notched Izod impact strength of 1.6 ft. lbs/in, a tangent modulus of 213,000, and other properties as shown in Table I.

COMPARATIVE EXAMPLE III

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 1.79 when measured in m-cresol at 60° C. A small amount of IRGANOX 1076, a conventional hindered phenolic antioxidant, was added as a stabilizer.

A molded sample of a blend of the polyketone polymer and 20% by weight (based on total blend) of GE's .400 PPO, a high molecular weight polyphenylene oxide, was produced with the same procedure as described in Comparative Example I except that 1% by weight of NUCREL 535 was added as a processing aid, 0.5% by weight of ETHANOX 330 was added as an antioxidant, the extrusion temperature was 260° C., the injection temperature was 240° C., and the injection pressure was 1200 psi. The polymer blend exhibited no improved properties in comparison to the polymer of Comparative Example I. The molded sample had a notched Izod impact strength of 1.5 ft. lbs/in, a modulus of 189,000 psi and other properties as shown in Table I.

TABLE I

| | Tangent Modulus psi | Yield psi | Stress @ Break, psi | Elongation @ Break, % (Range) |
|---|---|---|---|---|
| Comparative Example I | 202,000 | 8,000 | 6,700 | 38.9 (6–107) |
| Comparative Example II | 197,000 | 8,600 | 7,500 | 34.1 (15–88) |
| Illustrative Embodiment I | 213,000 | 6,500 | 6,400 | 10.3 (9–13) |
| Comparative Example III | 189,000 | 6,900 | 6,700 | 15 (13–19) |

What is claimed is:

1. A composition comprising a non-miscible blend of, as a major component, a linear alternating polymer of carbon monoxide and at least one ethylenically unsaturated hydrocarbon and, as a minor component, a poly(vinylaromatic)-modified polyphenylene oxide polymer.

2. The composition of claim 1 wherein the linear alternating polymer is represented by the repeating formula

wherein D is the moiety of an olefinically unsaturated hydrocarbon of at least 3 carbon atoms polymerized through the ethylenic unsaturation, and the ratio of y:x is no more than about 0.5:1.

3. The composition of claim 2 wherein the minor component is a polyphenylene oxide polymer of the repeating formula

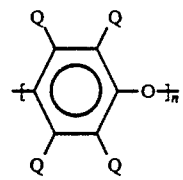

wherein n is an integer of at least 100, and Q independently is a monovalent substituent selected from hydrogen, halogen, hydrocarbon free from tertiary alpha-carbon atoms, halohydrocarbon having at least two carbon atoms between the halogen and the benzene ring and free from tertiary alpha-carbon atoms, hydrocarbonoxy free from tertiary alpha carbon atoms and halohydrocarbonoxy having at least two carbon atoms between the halogen and benzene ring and free from tertiary alpha carbon atoms, modified by the inclusion therewith of a polymerized vinylbenzene compound of the formula

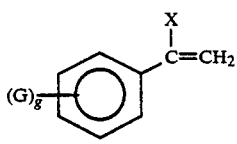

wherein X is hydrogen or lower alkyl, G is middle halogen or lower alkyl, and g is an integer from 0 to 5 inclusive.

4. The composition of claim 3 wherein y=0.

5. The composition of claim 3 wherein D is the moiety of propylene and the ratio of y:x is from about 0.01:1 to about 0.1:1.

6. The composition of claim 5 wherein the minor component is present in a quantity from about 0.5% by weight to about 45% by weight based on the weight of the major and minor components.

7. The composition of claim 6 wherein the polyphenylene oxide is poly(2,6-dimethylphenylene oxide).

8. The composition of claim 7 wherein the polymerized vinylbenzene compound is polystyrene.

9. The composition of claim 7 wherein the polymerized vinylbenzene compound is poly(alpha-methylstyrene).

10. The composition of claim 1 further comprising a processing aid in an amount less than 5% by weight of the composition.

11. The composition of claim 10 wherein the processing aid is an acid polymer present in an amount less than about 1% by weight of the composition.

* * * * *